United States Patent Office 2,893,975
Patented July 7, 1959

2,893,975

AZO DYE CONTAINING BLENDS OF STYRENE POLYMERS AND RUBBERY DIENE POLYMERS OF ENHANCED COLOR STABILIZED WITH BORIC ACID

Daniel A. Popielski, Springfield, Mass., assignor to Monsanto Chemical Company, St. Louis, Mo., a corporation of Delaware No Drawing. Application March 28, 1957
Serial No. 648,995

2 Claims. (Cl. 260—4)

The present invention relates to blends of styrene polymers and rubbery diene polymers containing azo dyes. More particularly, the invention relates to such azo dye containing polymer blends which have incorporated therein certain additives to enhance the color stability of the compositions.

It is known that polymer compositions having improved physical properties can be prepared by admixing or blending together styrene polymers and rubbery diene polymers. Such composition can be prepared by (1) mechanically blending the styrene polymer and the rubbery diene polymer on mechanical mixing equipment such as rubbery mills, (2) admixing latexes of the two polymers and recovering the polymers therefrom or (3) dissolving the rubbery diene polymer in styrene monomer and subsequently polymerizing the monomer. Compositions of the above type are known generically in the art as "polyblends." When such polyblends are prepared from a synthetic rubbery diene polymer or from a styrene polymer that is prepared by an emulsion polymerization process, the polyblend will inevitably contain a small quantity of alkali metal ions, usually sodium ions. These ions represent the residue of the alkali metal ion containing emulsifying agent employed in the polymerization of the synthetic rubbery diene polymer and/or the styrene polymer. When such alkali metal ion containing polyblends are colored with the usually stable calcium, strontium and barium salts of certain widely used azo dyes, it is observed that the colors are not stable at elevated temperatures and are degraded and/or altered in the processing of the polyblend, i.e., in the extrusion or molding of the colored polyblend. The problem is particularly severe when the colored polyblends are processed at temperatures in excess of about 425° F.

It is an object of this invention to provide blends of styrene polymers and rubbery diene polymers containing therein both alkali metal ions and calcium, strontium or barium salts of azo dyes, which compositions are characterized by having good color stability at elevated temperatures.

Other objects and advantages of this invention will be apparent from the following detailed descriptions thereof.

In accordance with the present invention, color stable blends of styrene polymers and rubbery diene polymers containing both alkali metal ions and calcium, strontium or barium salts of azo dyes are provided by incorporating in the compositions a minor but color stabilizing quantity of boric acid.

The following examples are set forth to illustrate more clearly the principle and practice of this invention to those skilled in the art. All parts are by weight.

EXAMPLE I

*Part A*

A colored polyblend composition is prepared by dry-blending 1 gram of a red azo dye with one pound of finely ground polyblend containing 0.2% stearic acid as an external lubricant. The mixture is dry-blended for 15 minutes in a tumbling type laboratory blender and the composition is extruded through a 1½" single screw extruder at 450° F. and chopped into pellets. Four rectangular pieces measuring 3" x 7" x ¼" are prepared from the pellets on a standard injection molding machine operating at 550° F. The red color of the molded pieces is faint and badly faded as compared to the color obtained by incorporating the same quantity of pigment in polystyrene and processing the polystyrene at the same temperatures.

The red azo dye employed in this example is the barium salt of the diazo coupling product of benzoic acid and betahydroxynaphthalene disulfonic acid. The polyblend employed consists of 90 parts of polystyrene having a molecular weight of approximately 65,000 (Staudinger) and 10 parts of an interpolymer of 50% butadiene and 50% styrene. The polyblend is prepared by admixing latexes of the polystyrene and the butadiene-styrene interpolymer in the proper proportions and recovering the polymers from the mixed latex by drum-drying. The polystyrene latex employed contains the sodium salt of a mahogany acid as the emulsifying agent and the butadiene-styrene interpolymer latex contains the sodium salt of a rosin acid as the emulsifying agent.

*Part B*

Part A is repeated except that 0.5 part of boric acid is incorporated in 100 parts of the polyblend during the dry-blending step. The injection molded samples prepared from this composition have a color intensity that is fully comparable to that developed by incorporating an equivalent quantity of the red azo dye in polystyrene.

EXAMPLE II

Example I is repeated except that the azo dye employed is the calcium salt of the diazo coupling product of 6-chloro-m-toluidine-4-sulfonic acid and beta-hydroxy-naphthoic acid. The results obtained parallel those of Example I in that a strong intense color is obtained when the boric acid is incorporated in the polyblend, whereas a faint, faded color is obtained in the absence of boric acid.

EXAMPLE III

Example II is repeated except that the polyblend employed is a product prepared by dissolving 6 parts of an interpolymer of 75% of butadiene and 25% of styrene in 94 parts of styrene monomer and subsequently polymerizing the styrene monomer by the conventional mass polymerization process. Comparable results are obtained, i.e., an intense color is obtained in the formulation containing the boric acid, whereas a degraded and faded color is obtained in the absence of boric acid.

The boric acid that is employed in the invention may be the ordinary article of commerce and no special purification treatment is required. In addition, the boric acid need not be dried to an anhydrous condition.

The quantity of boric acid employed is a minor one, but sufficient to stabilize the color of the composition. The precise quantity of boric acid required to stabilize the color of the compositions will vary considerably, depending upon the composition of the polyblend and particularly the quantity of alkali metal ions contained therein. In many cases, as little as 0.05 part of boric acid in 100 parts of the polyblend has a noticeable effect in improving the color stability of the compositions and there is little advantage obtained in incorporating more than about two parts of boric acid in 100 parts of the polyblend. In a preferred embodiment of the invention, from about 0.2 to about 1.0 part of boric acid is employed in 100 parts of the polyblend.

The polyblends employed in the invention contain at least minute quantities of alkali metal ions and may be prepared by any of the conventional methods, (1) by mechanically incorporating the rubbery diene polymer in the styrene polymer on mechanical mixing equipment such as rubber mills, (2) by admixing latexes of the two polymers and recovering the mixed polymers therefrom or (3) by dissolving the rubbery diene polymer in styrene monomer and subsequently polymerizing the monomer. In some cases, the polyblend prepared by any of the above described methods may be blended or admixed with additional styrene polymer or another polymer of a different chemical type. In all cases, the styrene polymer will be the predominant component of the ultimate polyblend and will usually constitute at least about 65% or preferably 85% of the polyblend.

The styrene polymers included in the polyblends are homopolymers of styrene and interpolymers of styrene containing more than 50 weight percent of styrene and preferably at least 85 weight percent of styrene. Where styrene interpolymers are employed, the balance of the interpolymer may be essentially any vinylidene monomer interpolymerizable with styrene such as butadiene, the acrylate esters, acrylonitrile, the methacrylate esters, etc. Such styrene polymers in general will have molecular weights of from about 40,000 to 100,000 as calculated by the Staudinger equation. All or a part of the styrene may be replaced with its closely related homologues such as alpha methylstyrene, vinyl toluene, p-ethylstyrene, 2,4-dimethylstyrene, etc.

The rubbery diene polymer included in the polyblends may be natural rubber, homopolymers of conjugated 1,3-dienes, rubbery interpolymers of conjugated 1,3-dienes and mixtures thereof. Where interpolymers of conjugated 1,3-dienes are employed, such interpolymers should contain at least 40 weight percent of the conjugated diene. The balance of the rubbery interpolymer will be one or more vinylidene monomers interpolymerizable with the conjugated 1,3-diene, e.g., styrene, acrylonitrile, the acrylate esters, etc. Typical examples of such rubbery diene polymers include natural rubber, polybutadiene, synthetic polyisoprene, butadiene-styrene interpolymers, butadiene-acrylonitrile interpolymers, etc. In all cases, rubbery diene polymer will have a brittle temperature of less than 0° C. as determined by ASTM Procedure D746–52T.

The azo dyes employed in the invention are the calcium, strontium and barium salts of azo dyes containing the structural grouping:

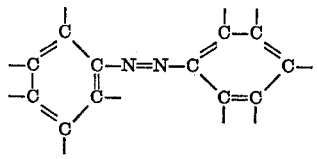

In the above structural grouping at least one of the valences on each of the benzene rings is satisfied with a radical of the group —COOH, —OH and —SO₃H. Dyes containing the above structural grouping constitute a well recognized class of organic dyes which are known generically in the plastics art as "azo dyes." Typical examples of such azo dyes include the diazo coupling products of benzoic acid and beta-hydroxynaphthalene disulfonic acid, the diazo coupling product of amino-benzoic acid and beta-hydroxynaphthoic acid, the diazo coupling product of 6-chloro-m-toluidine-4-sulfonic acid and beta-hydroxynaphthoic acid, the diazo coupling product of m-toluidine-4-sulfonic acid and beta-hydroxynaphthalene disulfonic acid, etc.

The above descriptions and particularly the examples are set forth by way of illustration only. Many other modifications and variations thereof will be apparent to those skilled in the art and can be made without departing from the spirit and scope of the invention herein described.

What is claimed is:

1. A plastic composition comprising (1) 100 parts of a blend of a major amount of a styrene polymer and a minor amount of a rubbery diene polymer that is colored with an azo dye of the group consisting of calcium, strontium and barium salts of azo dyes containing the structural group:

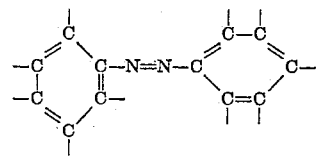

where at least one of the valances on each of the benzene rings is satisfied with a radical of the group consisting of —COOH, —OH and —SO₃H, and (2) 0.05–2.0 parts of boric acid.

2. A composition as in claim 1 wherein 0.2–1.0 of boric acid is employed per 100 parts of the blend of the styrene polymer and the rubbery diene polymer.

References Cited in the file of this patent
UNITED STATES PATENTS
2,617,783     Slocombe et al. _____ Nov. 11, 1952